(12) United States Patent
Rando

(10) Patent No.: US 6,202,312 B1
(45) Date of Patent: Mar. 20, 2001

(54) LASER TOOL FOR GENERATING PERPENDICULAR LINES OF LIGHT ON FLOOR

(75) Inventor: Joseph F. Rando, Los Altos Hills, CA (US)

(73) Assignee: Levelite Technology, Inc., Mountain View, CA (US)

( * ) Notice: Subject to any disclaimer, the term of this patent is extended or adjusted under 35 U.S.C. 154(b) by 0 days.

(21) Appl. No.: 09/264,371

(22) Filed: Mar. 8, 1999

(51) Int. Cl.[7] .............................. G01C 15/00; G01C 1/00; G02B 7/02
(52) U.S. Cl. .................. 33/227; 33/286; 33/DIG. 21; 356/138; 359/813; 359/822
(58) Field of Search .............................. 33/227, 228, 281, 33/282, 285, 286, DIG. 21; 356/138; 359/813, 822

(56) References Cited

U.S. PATENT DOCUMENTS

| 5,144,487 | * | 9/1992 | Hersey | 356/138 |
|---|---|---|---|---|
| 5,218,770 | | 6/1993 | Toga | 33/276 |
| 5,500,524 | | 3/1996 | Rando | 250/216 |
| 5,539,990 | * | 7/1996 | Le | 33/283 |
| 5,617,202 | | 4/1997 | Rando | 356/138 |
| 5,782,003 | * | 7/1998 | Bozzo | 33/291 |
| 5,864,956 | | 2/1999 | Dong | 33/227 |
| 5,872,657 | * | 2/1999 | Rando | 359/629 |
| 5,983,510 | * | 11/1999 | Wu et al. | 33/227 |

OTHER PUBLICATIONS

"BMI Laser–Technic"Catalog Hersbuck, Germany, Dec. 1995.

* cited by examiner

Primary Examiner—Randy W. Gibson
(74) Attorney, Agent, or Firm—Thomas M. Freiburger

(57) ABSTRACT

An apparatus and method for generating two or more visible lines of light on a floor for the purpose of facilitating the layout process used in construction. The apparatus comprises a light beam generator producing two or more beams of light at 90° to each other and in a plane parallel to the plane of the floor. Subsequently cylinder lenses on the apparatus spread the beams and position them on the floor or target providing visible reference lines.

10 Claims, 6 Drawing Sheets

LASER TOOL FOR GENERATING PERPENDICULAR LINES OF LIGHT ON FLOOR

BACKGROUND AND SUMMARY OF THE INVENTION

This invention relates to hand tools, and in particular the invention is concerned with a hand tool for projecting two or more reference beams of visible light for precise alignment on floors.

For some time laser beams have been used in construction for level reference, vertical references and layout on floors. The subject invention pertains to the last application, floor layout. It allows the user to project visible lines on the floor at precise angles for the purpose of marking the floor or to direct positions of objects or installations on the floor. Typically a construction worker marks the floor indicating the location of walls or other building elements to be constructed. In a like manner a tile layer marks the floor with reference lines. This is often done using a tape measure and a 3-4-5 triangle as shown in FIG. 1 of the drawings. This method is inaccurate and often requires two men. In an alternate method a transit equipped with a calibrated turntable is often used as shown in FIG. 2. In this case the operator sets the tripod over the first point with the aid of a plumb bob. Then the telescope of the transit is used to sight a known second point and the turntable angle is noted. Subsequently the turntable is turned to the required angle and the needed third point is marked by a second person communicating with the transit operator. This method can be very accurate but requires two men and is time consuming.

Many existing methods use small battery operated lasers to aid in the job of construction layout. For example, laying out 90° reference lines can be done using a visible laser beam generator such as the LeveLite manufactured by the assignee of this application. With that tool on its side, the self-leveling feature of the tool is disabled and visible light beams at 90° to each other can be used to project two lines at 90° to each other. FIG. 3 shows such a LeveLite tool 2 on an adjustable trivet 8. The light beams 4 and 6 may be pointed on a target or on the floor using knobs 10. The floor is subsequently marked for later use. In this case the lines are relatively short and difficult to position. To make the line on the floor longer a cylinder lens may be used as is shown in FIG. 4 depicting a system of U.S. Pat. No. 5,864,956. In this case a number of individual units project individual fan beams, with the beams fixed in their orientation to each base. The operator is unable to move the fan beam to position it on the floor where it is needed. Because the blocks are fastened together, tipping one axis to move the fan beam up or down causes the fan beam at 90° to rotate causing it to be no longer vertical.

In U.S. Pat. No. 5,539,990, as shown in FIG. 5, a self-leveling platform with two fan beams at 90° to each other is used. It uses a weight 11 and a bearing not shown to level the platform 13. In this case the beam location is not controlled by the operator and, therefore, a wide beam must be used spreading the light over a wide angle making it difficult to see.

Rotating lasers with a special transmitting penta prism are often used in this application, as shown in FIG. 6. In this case the rotating laser beam is visible on the floor or may be detected using a handheld detector. A portion of the beam is transmitted through the penta prism providing a 90° reference. This technique is expensive and it is difficult to see the beam because the light is spread over 360°.

An instrument using two rotating lasers is described in U.S. Pat. No. 5,218,770 and shown in FIG. 7. Again, the laser beams from this unit are difficult to see because the light is spread over a large area. In U.S. Pat. No. 5,218,770 two planes of light at 90° to each other are generated using a mirrored cone and two mirrors. The beams are so weak in this case that a special detector must be used to find the beam and in addition, two men may be required.

The subject invention is designed to overcome the limitations of the prior art by making the light-generated reference lines more visible and also adjustable as to height of projection, allowing layout by a single operator.

DESCRIPTION OF THE PREFERRED EMBODIMENTS

Figure 1:
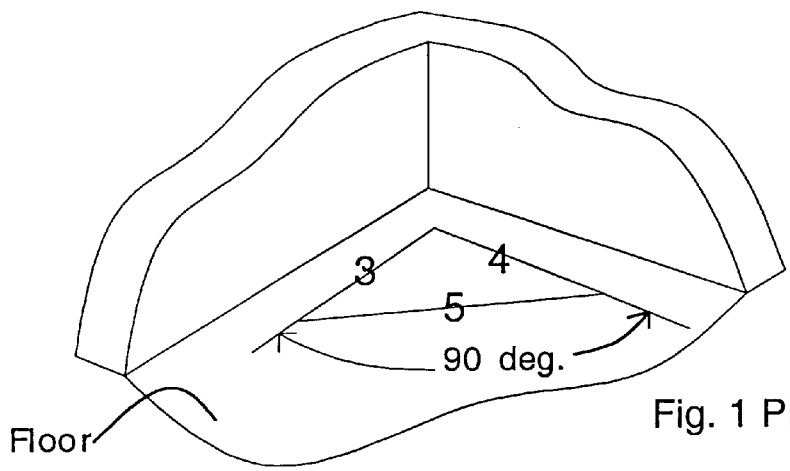
FIGS. 1–7 show various systems and devices according to the prior art for laying out two lines at 90° to each other. Some of these involve laser beams.
Figure 2:
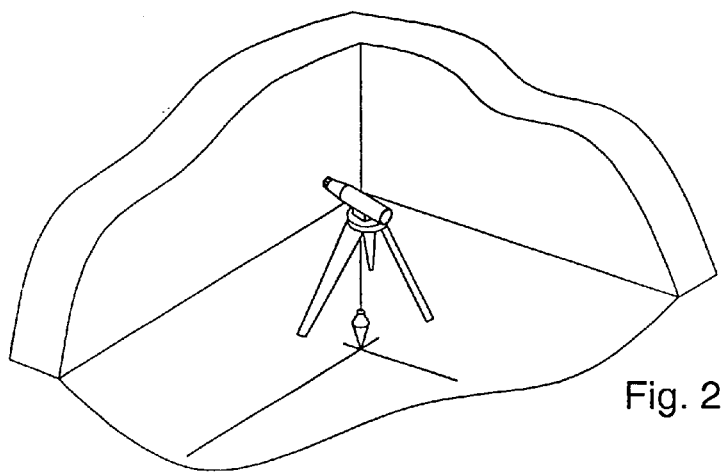
Figure 3:
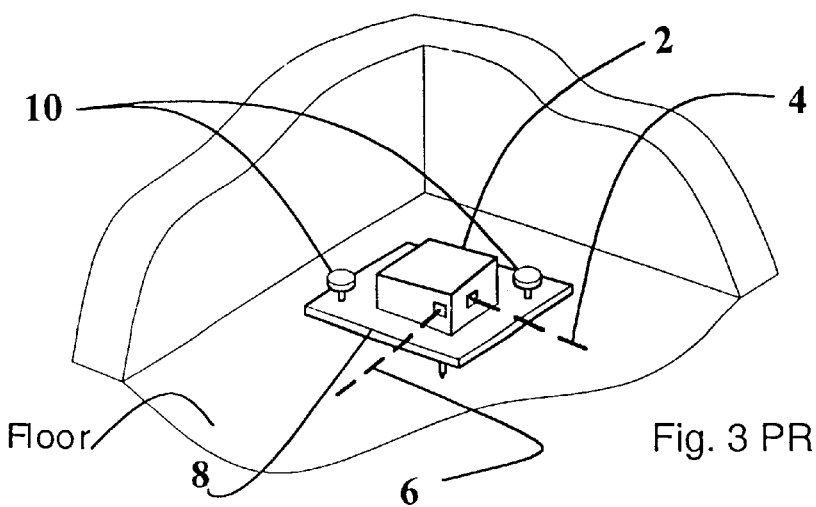
Figure 4:
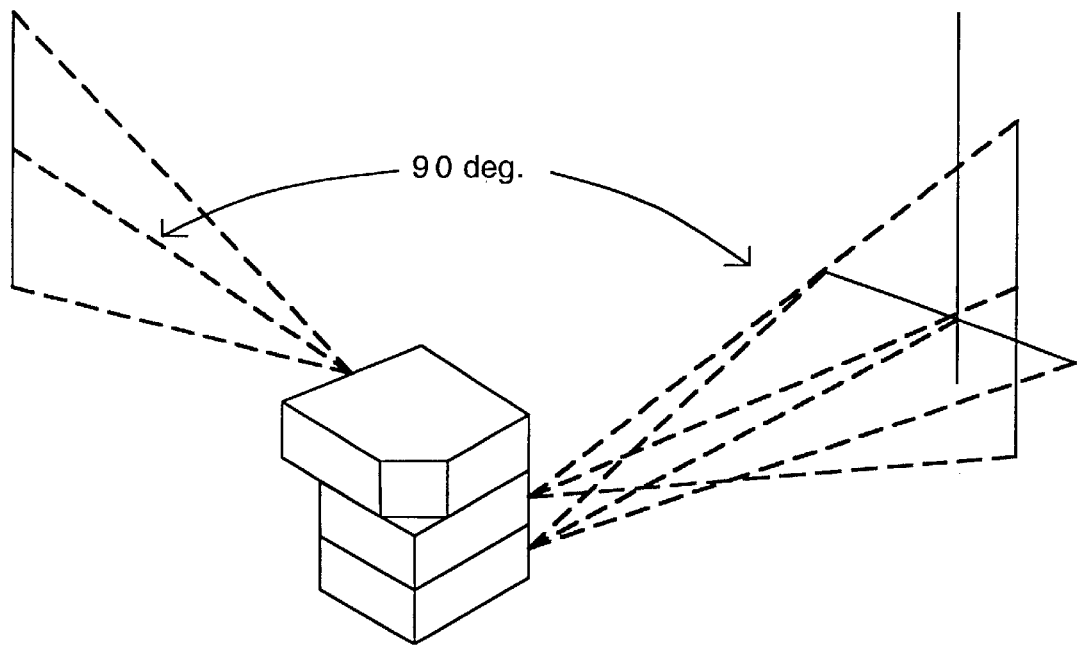
Figure 5:
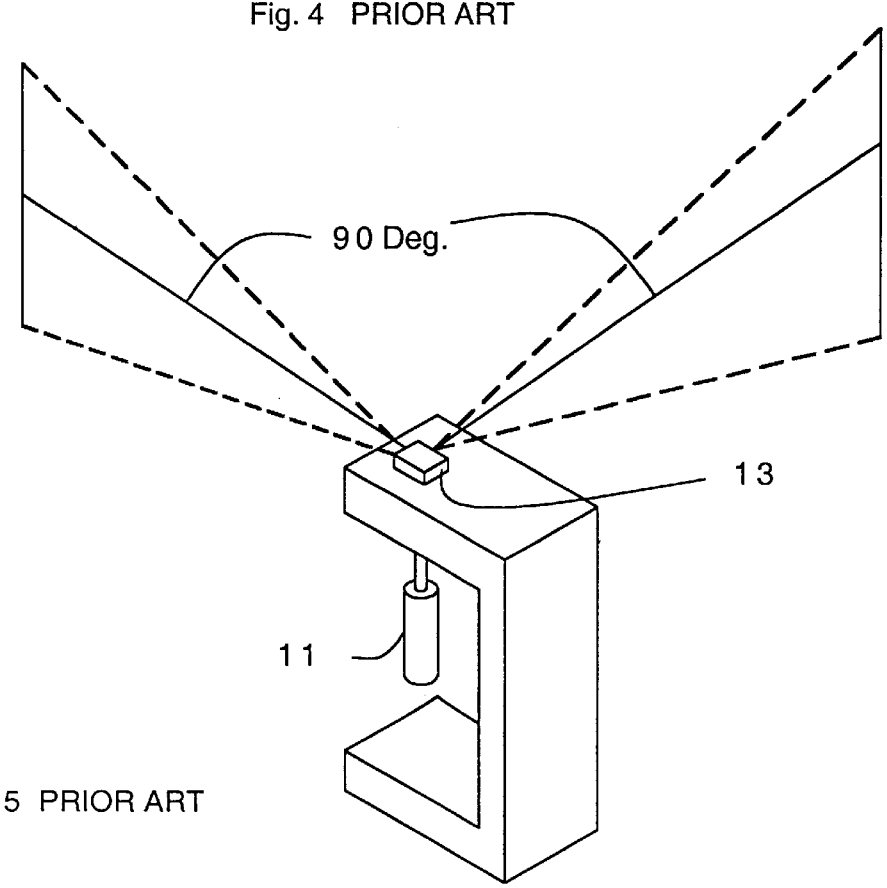
Figure 6:
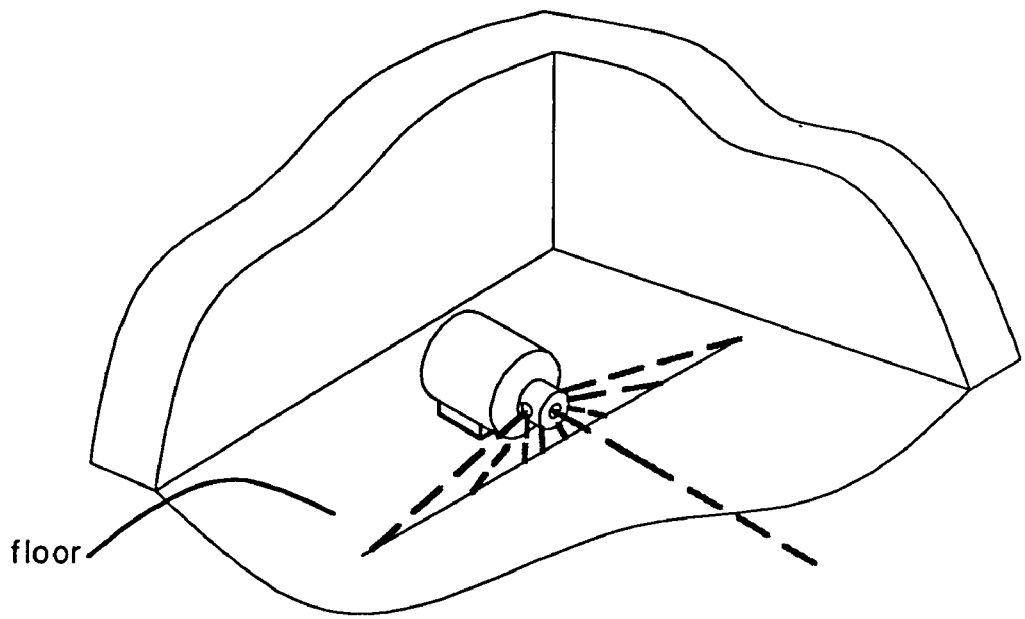
Figure 7:
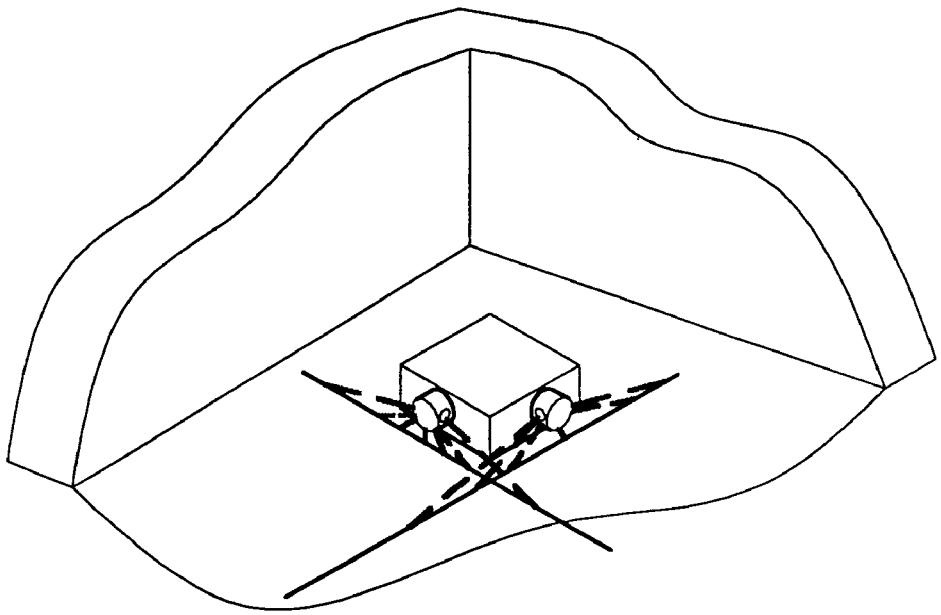
Figure 8:
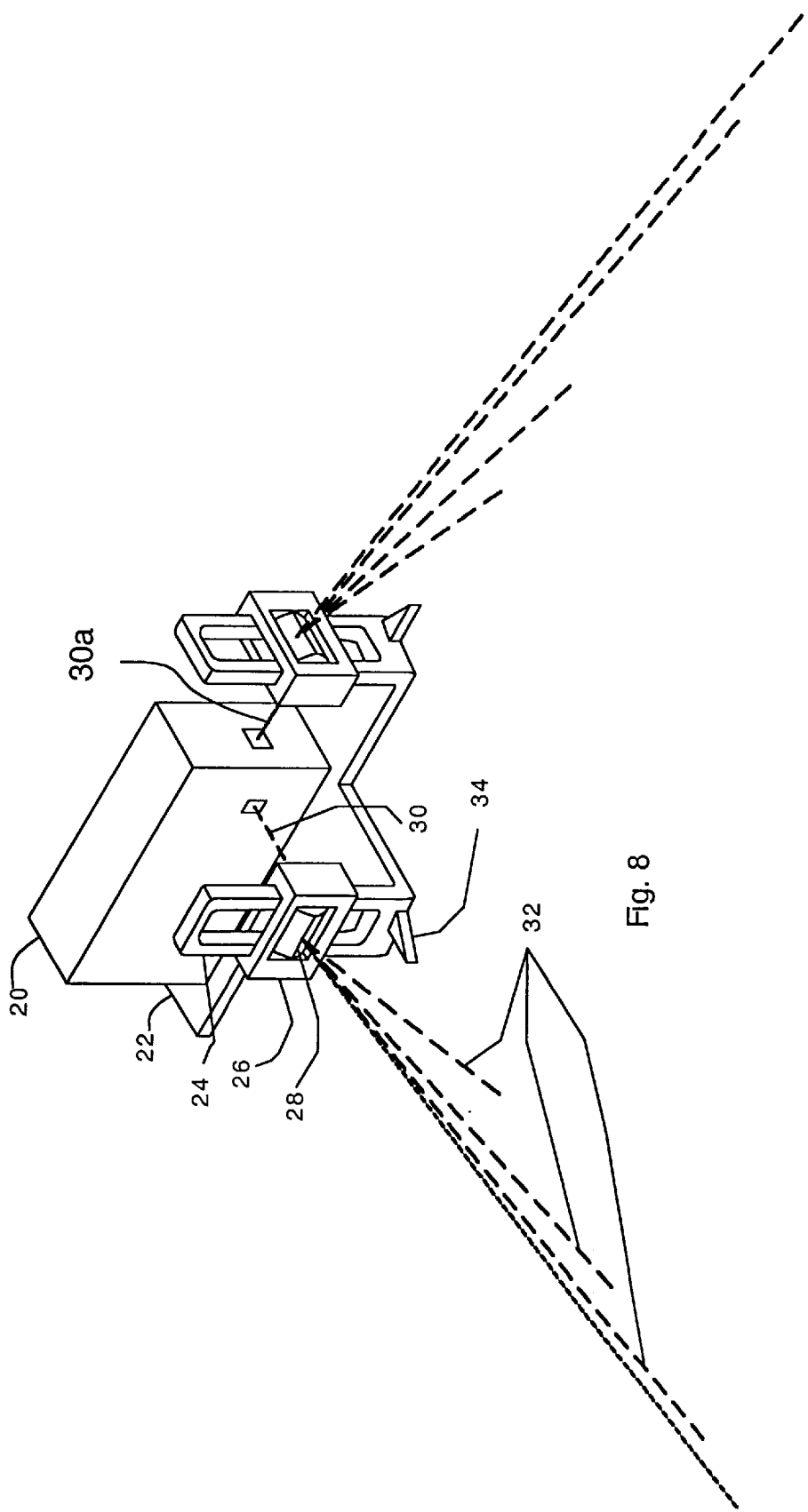
FIG. 8 shows, somewhat schematically, a device and system according to the invention.

The system of the invention is shown in FIG. 8. It comprises a beam generator 20 which produces two laser beams of visible laser light at precisely 90° to each other and in a plane parallel to the floor on which the unit is resting. Such beam generators are described in U.S. Pat. No. 5,617,202 and U.S. Pat. No. 5,500,524, belonging to the same assignee as this application, and incorporated by reference herein. The point of intersection of the two beams is indicated for positioning or marking. A cylinder lens in the path of each beam is used to direct the beams onto the floor by the operator for the purpose of positioning the beam on a target area. The axis of the cylinder lens is in a plane parallel to the floor plane in order to produce a fan beam perpendicular to the floor. The focal lengths of the lenses are chosen to spread the beam a minimal amount to place the light where it is needed thus producing the maximum visibility for the laser power available. For example, a focal length in the range of 60 mm works well with a laser diode collimated with a 10 mm focal length, providing a beam of appropriate height. However, the beam from the laser may be only collimated on one axis, to provide a beam which does not diverge horizontally. The natural spread of the beam in the generally vertical direction then combines with the effect of the cylinder lens, which can be less strong in this case.

A third lens and beam may be used to project three reference lines. The device allows for up/down adjustment of each lens to concentrate the beams and resulting lines where needed.

In FIG. 8 the light beam generator 20 produces two collimated beams of light at precisely 90° to each other. A base plate or housing or platform 22 supports the light beam generator 20 in secure and fixed position. The base plate preferably rests directly on the floor and thus provides the reference surface for the apparatus. A fixed vertical slide mount 24 supports an adjustable slider 26 which holds a cylinder lens 28. The slide mount 24 preferably is an extension of the platform or housing 22, molded of plastic material as part of the platform. A collimated beam of visible light 30 passes through the cylinder lens 28 and forms a narrow generally vertical fan beam 32 which can be directed onto the floor as desired by moving the slider 26 up and down. In addition the cylinder lens can be slid out of the way completely, preferably in the up direction, allowing a collimated beam of light to be projected parallel to the floor when needed. Such a concentrated beam of light would be the most visible. A reference mark 34 on the base plate 22 provides a means for marking the floor under the beam 30, or for aligning the tool with a mark on the floor or elsewhere.

Features identical to the features 24–34 are located on the base plate 22 at 90° from the first light beam 30, for a second beam 30*a*, as shown in FIG. 8. The two reference marks 34 on the tool locate the intersection of the two beams.

Figure 9:
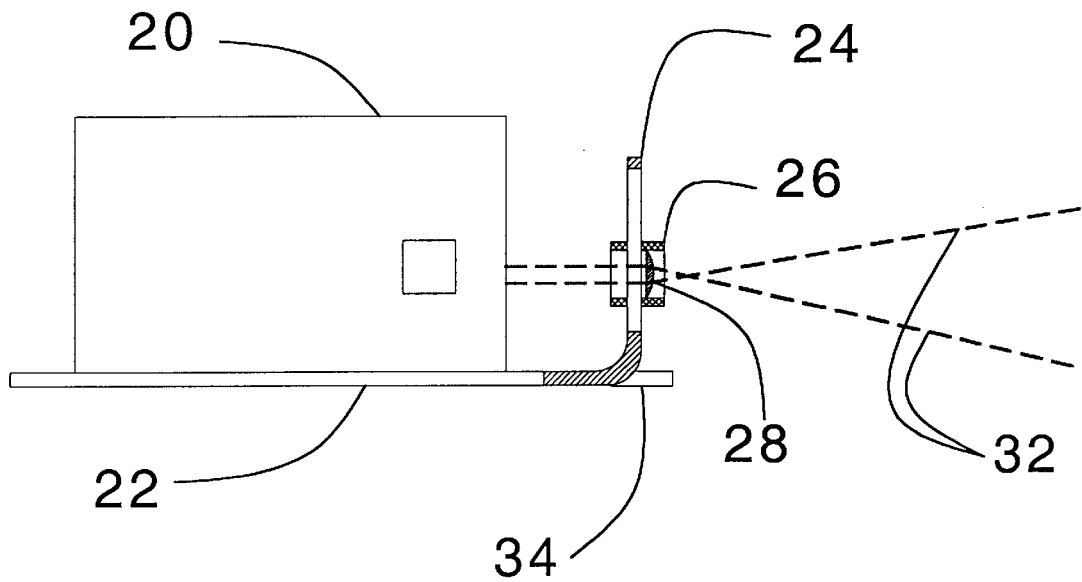
FIGS. 9 and 10 schematically show the device of the invention in elevation, partially in section, with an adjustable beam steering lens in different positions.
Figure 10:
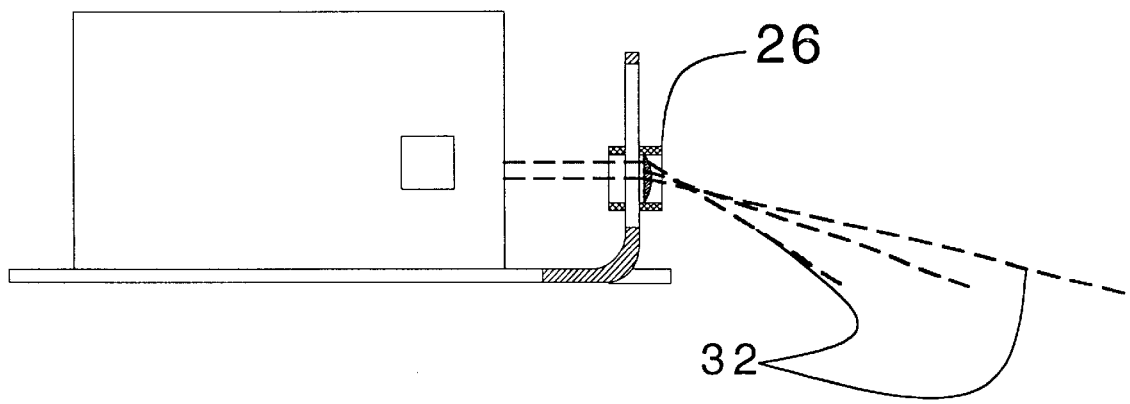

FIGS. 9 and 10 show a cross section through one slider 26. In FIG. 10 the slider is moved down, steering the beam to the floor. The slider motion allows the operator to steer the beam along the floor, to a wall or to the ceiling. The slider may also be moved out of the way to produce a beam of maximum visibility.

The slider 26 fits tightly and securely on the slide mount 24 to establish constant orientation of the lens as the slider is moved up and down. This is achieved preferably by use of a small leaf spring (not shown) acting between the slider and the outer edge of the slide mount, at one side of each slider.

Figure 11:
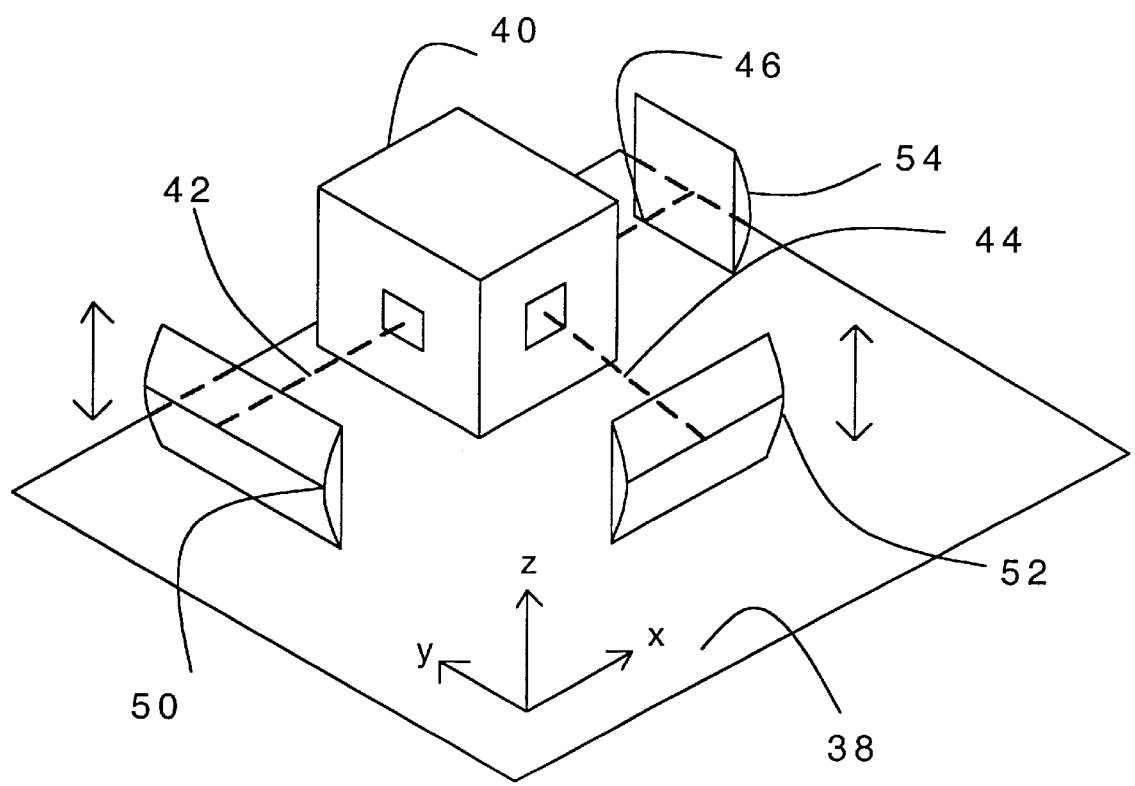
FIG. 11 is a schematic perspective view illustrating a three-lens system according to the invention.

FIG. 11 shows the cylinder lenses and their relation to the floor 38. A light beam generator 40 produces three beams of light 42, 44, and 46, each at 90° to the adjacent beam. A coordinate system with the floor 38 in the xy plane is shown in FIG. 11. To ensure that the fan beams generated by cylinder lenses 50, 52, and 54 are in essentially vertical planes (perpendicular to the floor or surface 38) the axes of the lenses must be in a plane parallel to the xy plane, i.e. the floor. Those axes should also be perpendicular to the incoming beam to provide a symmetrical beam. The slider 26 of FIG. 8 ensures the correct orientation of each lens as it moves on the slider.

The above described preferred embodiments are intended to illustrate the principles of the invention, but not to limit its scope. Other embodiments and variations to this preferred embodiment will be apparent to those skilled in the art and may be made without departing from the spirit and scope of the invention.

I claim:

1. A device for layout of objects or installations on a floor or other generally horizontal surface, along two angularly related lines on the floor or surface, comprising:

a platform or housing having a reference surface with means for holding the platform or housing in a position with the reference surface substantially parallel to the floor or other surface, a light beam generator producing at least two beams of visible light at a desired angle relative to one another, the beams being collimated at least in one axis and the beams being generally parallel to the reference surface, cylinder lens means in the path of at least one of the two beams, for spreading the beam into a fan of light essentially perpendicular to the reference surface, adjustment means connected to the cylinder lens means, for enabling manual adjustment of the cylinder lens means up or down relative to the reference surface, so as to enable steering of the fan of light to direct it higher or lower, so as to form lines on the floor or other generally horizontal surface or on one or more adjacent walls or vertical surfaces, and means on the platform or housing for marking or sighting on the floor the intersection of the two beams and of the two fans of light.

2. The device of claim 1, wherein said desired angle between the two beams of light is 90°.

3. The device of claim 1, wherein the cylinder lens means comprises a cylindrical lens, having an axis lying in a plane which is parallel to said reference surface.

4. The device of claim 1, including said cylinder lens means in the path of each of the beams of light.

5. The device of claim 4, including said adjustment means on each cylinder lens means.

6. The device of claim 1, wherein said means for holding the platform or housing comprises said reference surface being a bottom surface of the platform or housing, for placement directly on the floor or other generally horizontal surface.

7. The device of claim 1, wherein at least three beams are projected from the light beam generator, each at 90° relative to an adjacent one of the beams.

8. The device of claim 7, wherein the device includes a cylinder lens means in the path of each beam.

9. The device of claim 1 wherein the two beams of visible light are each fully collimated.

10. The device of claim 1, wherein the adjustment means comprises an integrally molded plastic slide mount extending generally vertically up from the platform or housing adjacent to the light beam, and a slider mounted stably on the slide mount for generally vertical sliding adjustment, with a cylinder lens fixed to the slider.

* * * * *